(12) United States Patent
Tanii et al.

(10) Patent No.: US 10,392,289 B2
(45) Date of Patent: Aug. 27, 2019

(54) METHOD FOR MANUFACTURING FLOAT GLASS, AND FLOAT GLASS

(71) Applicant: AGC INC., Tokyo (JP)

(72) Inventors: Shiro Tanii, Tokyo (JP); Takenori Miura, Tokyo (JP)

(73) Assignee: AGC INC., Tokyo (JP)

( * ) Notice: Subject to any disclaimer, the term of this patent is extended or adjusted under 35 U.S.C. 154(b) by 37 days.

(21) Appl. No.: 15/710,725

(22) Filed: Sep. 20, 2017

(65) Prior Publication Data

US 2018/0009695 A1 Jan. 11, 2018

Related U.S. Application Data

(60) Division of application No. 15/141,332, filed on Apr. 28, 2016, now Pat. No. 9,884,781, which is a
(Continued)

(30) Foreign Application Priority Data

Oct. 31, 2013 (JP) .................................. 2013-226604

(51) Int. Cl.
*C03B 18/00* (2006.01)
*C03B 18/18* (2006.01)
(Continued)

(52) U.S. Cl.
CPC .............. *C03B 18/18* (2013.01); *C03C 3/091* (2013.01); *C03C 21/005* (2013.01); *C22C 13/00* (2013.01); *Y02P 40/57* (2015.11)

(58) Field of Classification Search
CPC ................................................ C03B 18/00–22
See application file for complete search history.

(56) References Cited

U.S. PATENT DOCUMENTS 4,170,460 A 10/1979 Donley
4,395,272 A 7/1983 Kunkle et al.
(Continued)

FOREIGN PATENT DOCUMENTS

CN 103221352 A 7/2013
EP 2 641-881 A1 9/2013
(Continued)

OTHER PUBLICATIONS

Borsella et al. (2002), "Copper Doping of Silicate Glasses by the Ion-Exchange Technique: A Photoluminescence Spectroscopy Study", American Institute of Physics, Journal of Applied Physics, vol. 91, No. 1, pp. 90-96.
(Continued)

*Primary Examiner* — Jodi C Franklin
(74) *Attorney, Agent, or Firm* — Foley & Lardner LLP

(57) ABSTRACT

The present invention provides a tin alloy bath for a float bath, an apparatus for manufacturing a float glass, a method for manufacturing a float glass that can provide a high quality float glass in which defects due to coagulation and falling of a volatile tin component have been suppressed, and a float glass manufactured using those. The above-mentioned tin alloy bath for a float bath is a molten metal bath to be placed in the float bath for supplying molten glass to a liquid surface of the molten metal bath, thereby forming into a glass ribbon, and includes 1 mass % or more of copper with the remainder being unavoidable impurities and tin.

3 Claims, 7 Drawing Sheets

Related U.S. Application Data continuation of application No. PCT/JP2014/078672, filed on Oct. 28, 2014.

(51) Int. Cl.
  *C03C 21/00* (2006.01)
  *C03C 3/091* (2006.01)
  *C22C 13/00* (2006.01)

(56) References Cited

U.S. PATENT DOCUMENTS

| | | |
|---|---|---|
| 4,405,352 A | 9/1983 | Bloss et al. |
| 4,406,682 A | 9/1983 | Ernsberger |
| 6,065,309 A | 5/2000 | Cooper et al. |
| 2007/0172661 A1 | 7/2007 | Fechner et al. |
| 2014/0038807 A1* | 2/2014 | Tsujimura ............ C03C 3/091 501/66 |
| 2014/0264356 A1* | 9/2014 | Ellison ............... C03C 3/093 257/72 |

FOREIGN PATENT DOCUMENTS

| | | |
|---|---|---|
| JP | S58-104027 A | 6/1983 |
| WO | WO-2009/014028 A1 | 1/2009 |
| WO | WO-2012/066889 A1 | 5/2012 |
| WO | WO-2012137780 A1 * | 10/2012 ............ C03C 3/091 |

OTHER PUBLICATIONS

Gonella et al. (1998), "Experimental Study of Copper-Alkali Ion Exchange in Glass", American Institute of Physics, Journal of Applied Physics, vol. 83, No. 3, pp. 1200-1206.

Gonella et al. (2005), "Copper Diffusion in Ion-Exchanged Soda-Lime Glass", Springer-Verlag, Applied Physics A: Material Science & Processing, vol. 81, pp. 1065-1071.

Notice of Allowance issued in U.S. Appl. No. 15/141,332 dated Sep. 27, 2017.

Bledsoe et al., "Float reaction between sodium aluminoborosilicate glassmelts and copper-based liquid metal alloys," Journal of Non-Crystalline Solids 351, pp. 838-848 (2005).

International Search Report for PCT/JP2014/078672 dated Feb. 3, 2015.

* cited by examiner

METHOD FOR MANUFACTURING FLOAT GLASS, AND FLOAT GLASS

CROSS-REFERENCE TO RELATED APPLICATIONS

This application is a divisional of U.S. patent application Ser. No. 15/141,332, filed on Apr. 28, 2016, which is a continuation application filed under 35 U.S.C. 111(a) claiming the benefit under 35 U.S.C. §§ 120 and 365(c) of PCT International Application No. PCT/JP2014/078672, filed on Oct. 28, 2014, which is based upon and claims the benefit of priority of Japanese Patent Application No. 2013-226604, filed on Oct. 31, 2013, the entire contents of which are incorporated herein by reference in their entireties.

TECHNICAL FIELD

The present invention relates to a tin alloy bath for a float bath, an apparatus for manufacturing a float glass, a method for manufacturing a float glass, and a float glass.

BACKGROUND ART

In a method for manufacturing a glass by a float process, molten glass is continuously supplied to a horizontal bath surface of molten tin to form a ribbon-shaped glass (generally called a glass ribbon), and the glass ribbon is lifted from an exit side of a molten metal bath to draw outside the molten metal bath. The glass ribbon is then conveyed by conveying rolls (lift-out rolls) to carry in an annealing furnace and is gradually cooled while moving in the annealing furnace. The glass ribbon is cut into a necessary length by a cutting device in a next step, thereby manufacturing a sheet-shaped float glass.

The method for manufacturing a glass by a float process as described above forms one surface of a glass by a bath surface of molten metal, and forms the other surface of the glass by spreading molten glass on the molten metal. This manufacturing method makes it possible to extremely improve flatness of a glass, and is therefore known as a manufacturing method suitable for mass-production. For this reason, this float process is widely applied to the manufacturing of a sheet glass such as an automobile glass and a display glass.

FIG. 8 shows one example of the conventional apparatus for manufacturing a float glass, applied to the float process of this kind. The apparatus of this example is constituted of a float bath 101 having a molten metal bath 100 of tin, a dross box 102 provided at a downstream side of the float bath 101, and an annealing furnace 103. A plurality of lift-out rolls 105 are horizontally arranged inside the dross box 102, and a plurality of lehr rolls 106 are horizontally arranged inside the annealing furnace 103 (see Patent Document 1).

In the manufacturing apparatus shown in FIG. 8, molten glass 107 is supplied to a bath surface of the molten metal bath 100, and is drawn out into necessary thickness and width. A glass ribbon 108 thus obtained is taken out by traction force of the lift-out rolls 105, and can be conveyed to the side of the annealing furnace 103.

BACKGROUND ART DOCUMENT

Patent Document

Patent Document 1: WO 2009/014028

SUMMARY OF THE INVENTION

Problems that the Invention is to Solve

In the case where the glass ribbon 108 is lifted from a bath surface of a molten tin and conveyed by the lift-out rolls 105 in a float process, a slight amount of tin vapor is present in an upper space of the glass ribbon 108. When a part of the tin vapor coagulates, falls down on the glass ribbon 108 and attaches thereto as tin oxide, there is a problem that the tin oxide becomes a foreign material, resulting in defects of a glass.

At present, it is general to use pure tin for the molten metal bath 100 used in a float process. In the case of manufacturing soda-lime glass, the glass can be formed in the float bath 101 at relatively low temperature. As a result, a vapor pressure of tin can be suppressed low.

However, in alkali-free glass applied to a liquid crystal display device and the like, its manufacturing temperature is high. As a result, vapor pressure of tin is high, and the defects of tin oxide called top specks due to coagulation and falling of tin vapor are generated in many cases.

FIG. 9 is a graph showing the relationship between vapor pressures of Sn and SnO and temperatures thereof. For example, in the molten metal bath 100 of tin placed in the float bath 101 shown in FIG. 8, whether Sn converts to SnO or $SnO_2$ by oxidation depends on the conditions.

However, a vapor pressure of SnO is high. Therefore, considerable difference occurs between a vapor pressure of SnO and a vapor pressure of Sn, and as shown in FIG. 9, it is apparent that vapor pressure difference of 10,000 times is generated in the vicinity of 1,200° C. and volatilization occurs. Thus, oxidation mechanism of tin is complicated, and when a volatile matter is rapidly increased and coagulated and then falls down on the surface of a glass, detects may occur.

The present invention has been made in view of the above points, and has an object to provide a tin alloy bath for a float bath, an apparatus for manufacturing a float glass, a method for manufacturing a float glass that can provide a high quality float glass in which defects due to coagulation and falling of a volatile tin component have been suppressed, and a float glass manufactured using those.

Means for Solving the Problems

As a result of intensive investigations to achieve the above object, the present inventors have found that by using a tin alloy bath in which a predetermined amount of copper is added to molten tin, a vapor pressure can be reduced as compared with a tin bath, the volatilization volume can be reduced in a float bath as compared with a tin bath, and top specks of a glass formed can be suppressed, and have completed the present invention.

Namely, the present invention provides the following (1) and (2).

(1) A method for manufacturing a float glass, including: supplying molten glass to a liquid surface of a molten metal bath placed in a float bath, thereby forming into a glass ribbon; lifting the glass ribbon from the liquid surface of the molten metal bath, followed by annealing and cutting to obtain a float glass, in which the molten metal bath is a tin alloy bath for a float bath, which includes 1 mass % or more and 40 mass % or less of copper with the remainder being unavoidable impurities and tin, and a temperature of a region at which the glass ribbon is lifted from the liquid surface of the molten metal bath in the float bath is 700° C. or higher.

(2) A float glass in which a concentration of copper at a depth of 30 μm on a surface side of the float glass, which has been in contact with a molten metal bath, is 5 mass ppm or more and 50 mass ppm or less, and a concentration of copper on an outermost surface on a surface side of the float glass, which has not been in contact with the molten metal bath, is 1 mass ppm or less.

Advantage of the Invention

According to the present invention, a tin alloy bath for a float bath, an apparatus for manufacturing a float glass, a method for manufacturing a float glass that can provide a high quality float glass in which defects due to coagulation and falling of a volatile tin component have been suppressed, and a float glass manufactured using those can be provided.

MODE FOR CARRYING OUT THE INVENTION

One embodiment of the present invention is descried below by reference to the accompanying drawings, but the present invention is not limited to the embodiment described below.

Figure 1:
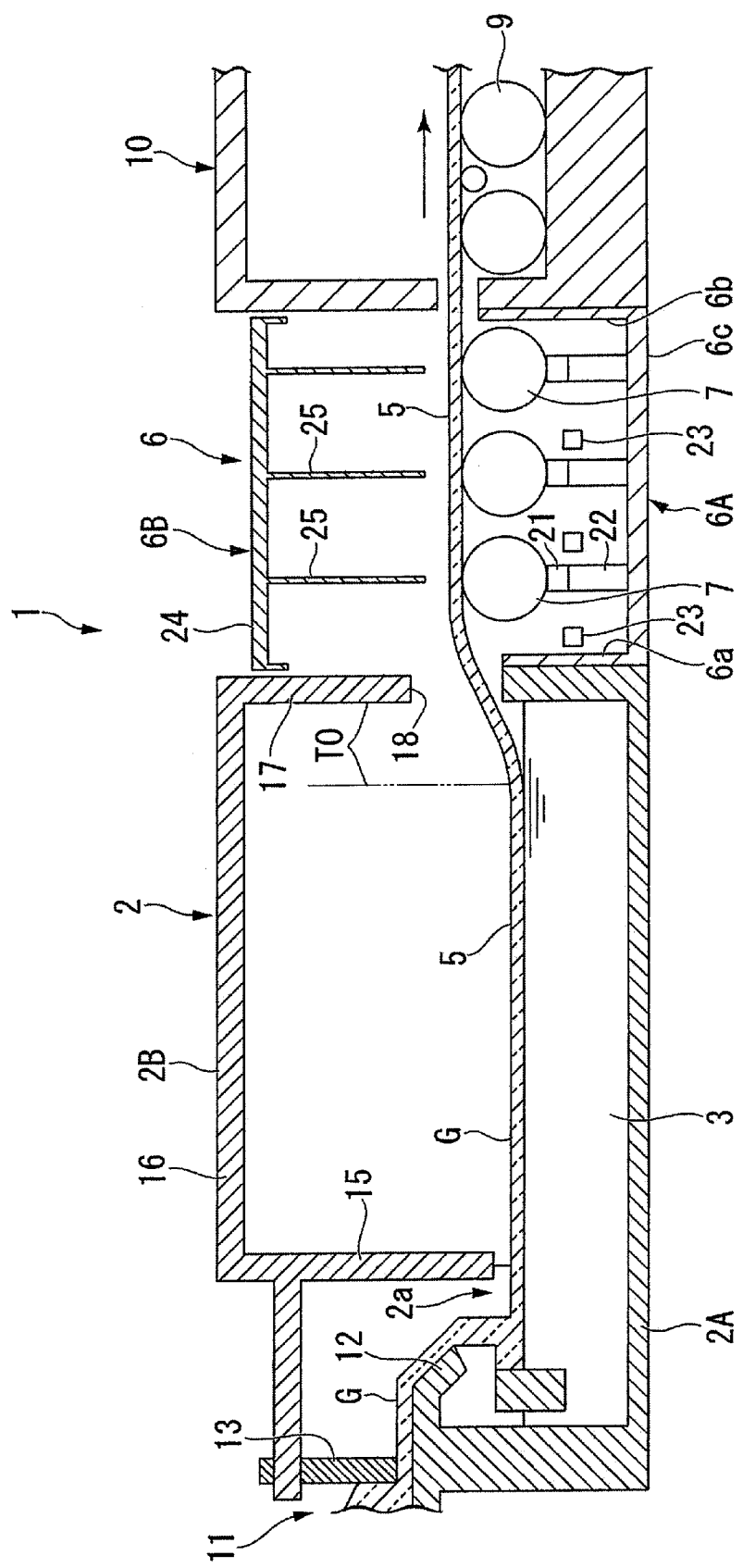
FIG. 1 is a vertically cross-sectional view showing one embodiment of an apparatus for manufacturing a float glass.
Figure 2:
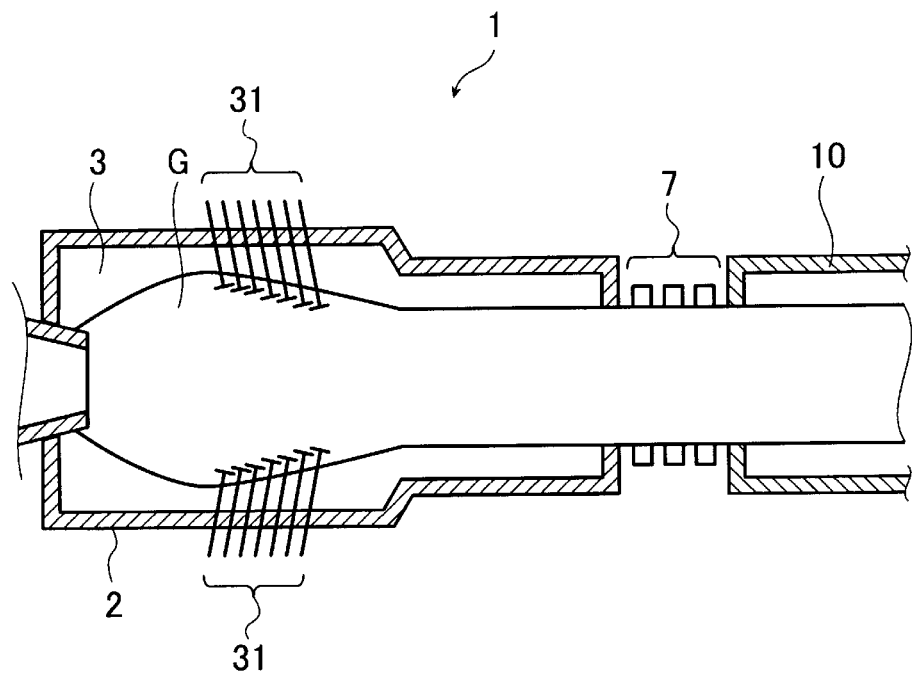
FIG. 2 is a horizontally cross-sectional view showing one embodiment of an apparatus for manufacturing a float glass.
Figure 3:
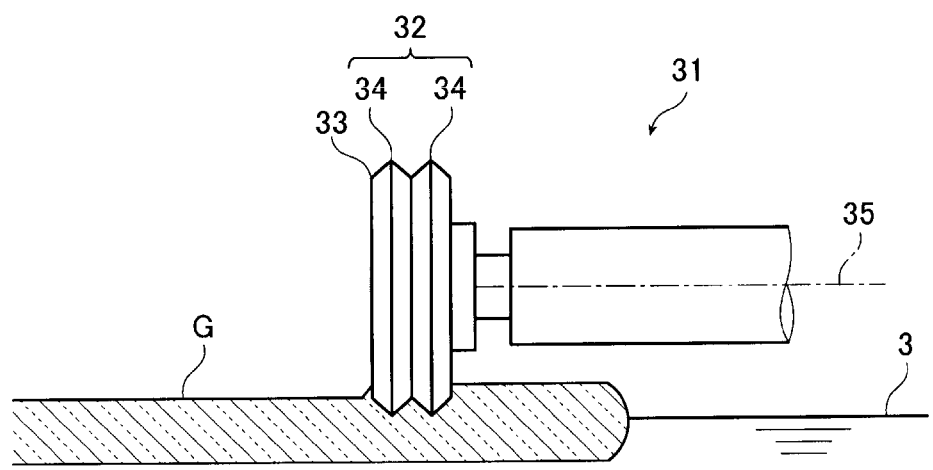
FIG. 3 is a schematic view showing molten glass and a top roll.

FIG. 1 is a vertically cross-sectional view showing one embodiment of an apparatus for manufacturing a float glass. In FIG. 1, the illustration of top rolls 31 shown in FIGS. 2 and 3 is omitted.

As shown in FIG. 1, an apparatus 1 for manufacturing a float glass of the present embodiment is constituted as an apparatus of flowing molten glass G supplied to a float bath 2 along the surface of a molten metal bath 3 placed in the float bath 2 to form a band-shaped glass ribbon 5, and drawing out the glass ribbon 5 by lift-out rolls 7 provided in a dross box part 6.

In the manufacturing apparatus 1 of the present embodiment, the glass ribbon 5 is taken out of an outlet of the dross box part 6, drawn into an annealing furnace 10 by lehr rolls 9, cooled, cleaned and then cut into a predetermined size. Thus, a float glass having a desired size is obtained.

The molten glass G sent from a melting furnace (not shown) through a supply passage 11 is supplied to an inlet 2a of the float bath 2 through a lip 12 provided at the end of the supply passage 11. A tweel 13 for controlling flow of the molten glass is arranged in freely vertically movable state in the supply passage 11 at the upstream side of the lip 12. The supply passage 11 and float bath 2 are constituted by assembling a plurality of a heat-insulating material such as a firebrick, respectively, but are simplified and shown in FIG. 1.

As shown in FIG. 1, the float bath 2 includes a molten metal bathtub 2A filled with a molten metal bath 3, and an upper structure 2B provided upper the molten metal bathtub 2A, and has a constitution that the inside of the float bath 2 is shielded from outer atmosphere as much as possible.

Heaters (not shown) are provided in the float bath 2, and the float bath is constituted such that the inner temperature can be adjusted every region.

In the float bath 2 of the present embodiment, the molten metal bath 3 includes a tin alloy bath in which a predetermined amount of copper (Cu) is contained in tin (Sn). The content of copper in the tin alloy bath is in a range of 1 mass % or more, preferably in a range of 40 mass % or less, and more preferably in a range of from 30 to 40 mass %.

When copper is added to tin, copper having high reducibility covers the surface of tin to suppress the evaporation of tin. Furthermore, it can be assumed that energy required in volatilization is increased by changing chemical bond state of a tin alloy due to the addition of copper, and as a result, the volatilization volume is greatly decreased as compared with vapor pressure reduction expected from partial pressure. For this reason, it is required that copper is contained in an amount of 1 mass % or more. On the other hand, judging from a state diagram and the like, the upper limit of copper is a limiting concentration at which an intermetallic compound having high melting point is formed when a temperature is decreased. Regarding the effect by the addition of copper, volatilization is not substantially observed in an amount of 30 mass %. Therefore, it is preferred to select an optimum value.

The tin alloy bath constituting the molten metal bath 3 may contain lead (Pb), zinc (Zn), iron (Fe), nickel (Ni) and the like as unavoidable impurities in an amount of about 0.3 mass %.

A front lintel 15 as a front wall is formed in the inlet 2a of the float bath 2, and the upper portion of the front lintel 15 is connected to a ceiling wall 16. A rear end wall 17 is provided at a downstream end side of the float bath 2 so as to connect to the ceiling wall 16, and an exit 18 of the glass ribbon 5 is formed at a position near a liquid surface of the molten metal bath 3 in the rear end wall 17. In the float bath 2, an upper structure 2B is constituted of the front lintel 15, the ceiling wall 16 and the rear end wall 17.

Pipes (not shown) are provided in the upper structure 2B, and reducing mixed gas including hydrogen and nitrogen is supplied though the pipes, and the inner space of the float bath 2 is always held in reducing atmosphere higher than the atmospheric pressure. The reducing atmospheric gas in the float bath 2 slightly flows out to the side of the dross box part 6 from the exit 18 from which the glass ribbon 5 is drawn out.

The dross box part 6 provided at the latter part side of the float bath 2 includes a lower casing 6A and an upper casing 6B, and in the present embodiment, three lift-out rolls 7 are horizontally provided at even intervals in the lower casing 6A. The lift-out roll 7 is roughly constituted of a roll body part formed by, for example, quartz and a shaft supporting the roll body part. The number of the lift-out rolls 7 provided is not limited to three rolls as in the present embodiment, and the number thereof is not limited so long as the glass ribbon 5 can be conveyed to the annealing furnace 10 side. The lower casing 6A has a side wall 6a at the float bath 2 side and a side wall 6b at the annealing furnace 10 side on a bottom wall 6c, has other side walls (not shown) stood at both sides in a width direction of the side wall 6a and the side wall 6b, and is constituted in a box shape in which the upper side of each side wall opens.

Graphite seal blocks 21 and wall-shaped pedestals 22 are arranged at the lower part of the lift-out rolls 7 in order to shield atmospheric current between the molten metal bathtub 2A and the annealing furnace 10. The seal block 21 is provided on the pedestal 22 such that the upper surface thereof comes into contact with roll surface of the lift-out roll 7, and partitions such that a space between the seal block 21 and the circumferential surface of the lift-out roll 7 is airtight to a certain extent. The pedestal 22 is constituted of thick metal pieces such as ductile cast iron in a wall shape, and is provided so as to partition the inside of the lower casing 6A.

Supply pipes 23 for spouting non-oxidizing gas, for example, inert gas such as nitrogen; reducing gas such as hydrogen; and mixed gas thereof, are arranged in the lower space of the lift-out rolls 7. In the present embodiment, the non-oxidizing gas spouted from the supply pipes 23 is preferably spouted after preheating to a temperature of from 400 to 600° C. The reason for this is to prevent that the glass ribbon 5 is locally cooled by the spouting of the non-oxidizing gas.

Heaters (not shown) are provided in the dross box part 6, so that the temperature of the glass ribbon 5 can be controlled.

The upper casing 6B of the dross box part 6 is constituted as a sealing gate made of a steel material, is constituted to include a ceiling wall 24 located between the float bath 2 and the annealing furnace 10 and stainless steel drapes 25 hung down from the ceiling wall 24, and is arranged at the upper side of the lower casing 6A. A plurality of the drapes 25 hung down from the ceiling wall 24 are arranged so as to be along the upper part of contact positions between three lift-out rolls 7 and the glass ribbon 5 moving on the upper part thereof. That is, those drapes 25 are arranged upper the central axes of the lift-out rolls 7 so as to cover the overall length of the lift-out rolls 7, and partition the inner space of the upper casing 6B into plural spaces.

A plurality of lehr rolls 9 are horizontally arranged in the annealing furnace 10, and the glass ribbon 5 that moved through the dross box part 6 can be conveyed to the annealing furnace 10 by a plurality of the lehr rolls 9.

Top rolls 31 are described below based on FIG. 2 and FIG. 3.

FIG. 2 is a horizontally cross-sectional view showing one embodiment of an apparatus for manufacturing a float glass. As described above, the molten glass G introduced in the float bath 2 continuously moves toward the downstream side of the float bath 2 from the upstream side thereof in the state of floating on the surface of the molten metal bath 3, whereby the glass ribbon 5 is formed.

The molten glass G (glass ribbon 5) tends to reach an equilibrium thickness by the relationship between surface tension and gravity in an unrestraint state. On the other hand, the molten glass G is conveyed by pulling in the direction of movement. As a result, particularly, the width (a vertical length in FIG. 2) tends to contract toward a central direction. Therefore, the top rolls 31 are used to suppress contraction of the molten glass G (glass ribbon 5) and obtain a desired thickness. The top rolls 31 are arranged in both sides at the upstream side of the float bath 2 as shown in FIG. 2.

FIG. 3 is a schematic view showing molten glass and a top roll. As shown in FIG. 3, the top roll 31 has a disk-shaped rotary member 33 at tip 32 thereof. The rotary member 33 freely rotates to a central axis 35 of the top roll 31. Protrusions 34 are formed along a circumferential direction on the circumference of the rotary member 33. Material of the rotary member 33 is not particularly limited, and examples thereof include metals such as steel or heat-resistant alloy. The rotary member may be subjected to surface coating or surface modification.

The tip 32 including the rotary member 33 comes into contact with the glass ribbon 5 having high temperature. Therefore, the temperature of the tip may be remarkably increased during use. For this reason, the top roll 31 has the constitution that it is cooled by passing cooling water through an inner space (not shown) of the tip 32. Thus, the temperature increase of the tip 32 can be suppressed.

The method for manufacturing a float glass using the manufacturing apparatus 1 of a float glass having the above constitution is described below.

To manufacture the glass ribbon 5 using the manufacturing apparatus shown in FIG. 1, the molten glass G is supplied to the supply passage 11 from a melting furnace, and the molten glass G is supplied on the molten metal bath 3 of the inlet 2a of the float bath 2 while adjusting a flow rate of the molten glass G flowing on the lip 12 by a damming amount of the tweel 13.

In the float bath 2, the rotary member 33 (particularly, protrusions 34) of the top roll 31 described based on FIG. 2 and FIG. 3 is brought into contact with the surface of both side portions along the direction of movement of the molten glass G, thereby holding down the molten glass G and rotating the rotary member 33. Thereby, the molten glass G is restrained by the rotary member 33, contraction to a width direction is suppressed, and the molten glass G is conveyed with desired width and thickness. Thus, the molten glass G that has been flown on the molten metal bath 3 is formed into the band-shaped glass ribbon 5 having a predetermined width and a predetermined thickness. The glass ribbon 5 is drawn and lifted from the liquid surface of the molten metal bath 3 by the lift-out rolls 7, and is moved to the dross box part 6 side. The glass ribbon 5 is then cooled while conveying in the annealing furnace 10 by the lehr rolls 9. The glass ribbon 5 which has been cooled in the annealing furnace 10 is cut into necessary length and width in a cutting step. Thus, a float glass having the desired width and length can be manufactured.

In the case where the molten glass G is supplied to the molten metal bath 3 and is formed into the glass ribbon 5, the glass ribbon 5 is formed while supplying nitrogen gas and hydrogen gas into the float bath 2 to form reducing atmosphere. Furthermore, it is preferred to supply non-oxidizing gas to the dross box part 6 which is provided for conveying the glass ribbon 5.

In the manufacturing apparatus 1 of the present embodiment, the molten metal bath 3 of the float bath 2 is constituted of a tin alloy bath including copper in an amount of 1 mass % or more. This makes it possible to decrease a vapor pressure to about 1/10, as compared with a tin bath of 100% tin, and the volatilization volume of the molten metal bath 3 can be reduced substantially zero.

For this reason, the amount of tin vapor present in the float bath 2 can be reduced. As a result, defects called top speck generated on a glass due to coagulation and falling of tin vapor can be suppressed, whereby high quality float glass can be manufactured.

A region (takeoff part TO) at which the glass ribbon 5 is lifted from the liquid surface of the molten metal bath 3 and is separated is present in the float bath 2. That is, the takeoff part TO indicates a position at which the glass ribbon 5 separates from the liquid surface when the glass ribbon 5 is continuously lifted from the liquid surface of the molten metal bath 3.

As described above, heaters (not shown) are provided in the float bath 2, and the temperature in the float bath 2 is adjusted so as to be gradually decreased toward the takeoff part TO of the downstream side from the upstream side. The reason for this is that hardness to a certain extent is required in order to lift the glass ribbon 5 at the takeoff part TO.

The temperature of the takeoff part TO is about 580° C. in the case where a float glass to be manufactured is soda-lime glass.

On the other hand, in the case of manufacturing alkali-free glass to be used in, for example, a liquid crystal display device, the temperature of the takeoff part TO is, for example, 700° C. or higher, and preferably about 750° C. The upper limit temperature thereof is not particularly limited, but considering creep characteristics of a member (stainless steel or the like) used, the temperature is preferably 900° C. or lower.

The temperature of the takeoff part TO in a float process is determined from viscosity of a glass. For example, in order to suppress deformation after a heat treatment (about 600° C.) conducted in the course of liquid crystal production, alkali-free glass to be used in a liquid crystal display device or the like has a composition having a strain point as high as possible (becoming high viscosity). Therefore, the temperature of the takeoff part TO naturally becomes high.

In a glass composition, a stain point is greatly influenced by $Al_2O_3$ content. As described hereinafter, the $Al_2O_3$ content in alkali-free glass used in the present embodiment is, for example, from 10.5 to 24 mass %. In the case where the $Al_2O_3$ content exceeds 10 mass %, viscosity at low temperature is remarkably increased. For this reason, in the case where the temperature of the takeoff part TO is, for example, 500° C. or lower, even if a glass composition other than $Al_2O_3$ is changed, the glass ribbon 5 breaks when lifting, and a float glass cannot be manufactured.

The temperature in the float bath 2 (including the temperature of the takeoff part TO) is a temperature including not only a glass (the molten glass G and the glass ribbon 5), but also ambient atmosphere, and can be measured using, for example, a radiation thermometer.

In the case of manufacturing a float glass such as alkali-free glass having high temperature of the takeoff part TO, the temperature of the molten metal bath 3 also becomes high. Therefore, in the case of using molten metal of 100% tin, the amount of tin vapor in the float bath 2 is also increased.

However, when the tin alloy bath of the present embodiment is used, the amount of vapor can be reduced even though the temperature of the molten metal bath 3 in the float bath 2 is increased. As a result, the high quality glass ribbon 5 free from defects called top speck can be manufactured.

In the test results (see FIG. 7) shown in "Examples" described hereinafter, it is understood that in a tin alloy bath containing copper in an amount of 30 mass %, volatilization volume in the case of holding at 1200° C. in reducing atmosphere can be greatly reduced as compared with the case of a tin bath.

For this reason, by using the copper-containing tin alloy bath having the above-described composition as the molten metal bath 3, volatilization volume from the tin alloy bath can be decreased, and as a result, a high quality float glass free from defects called top speck can be provided.

Figure 4:
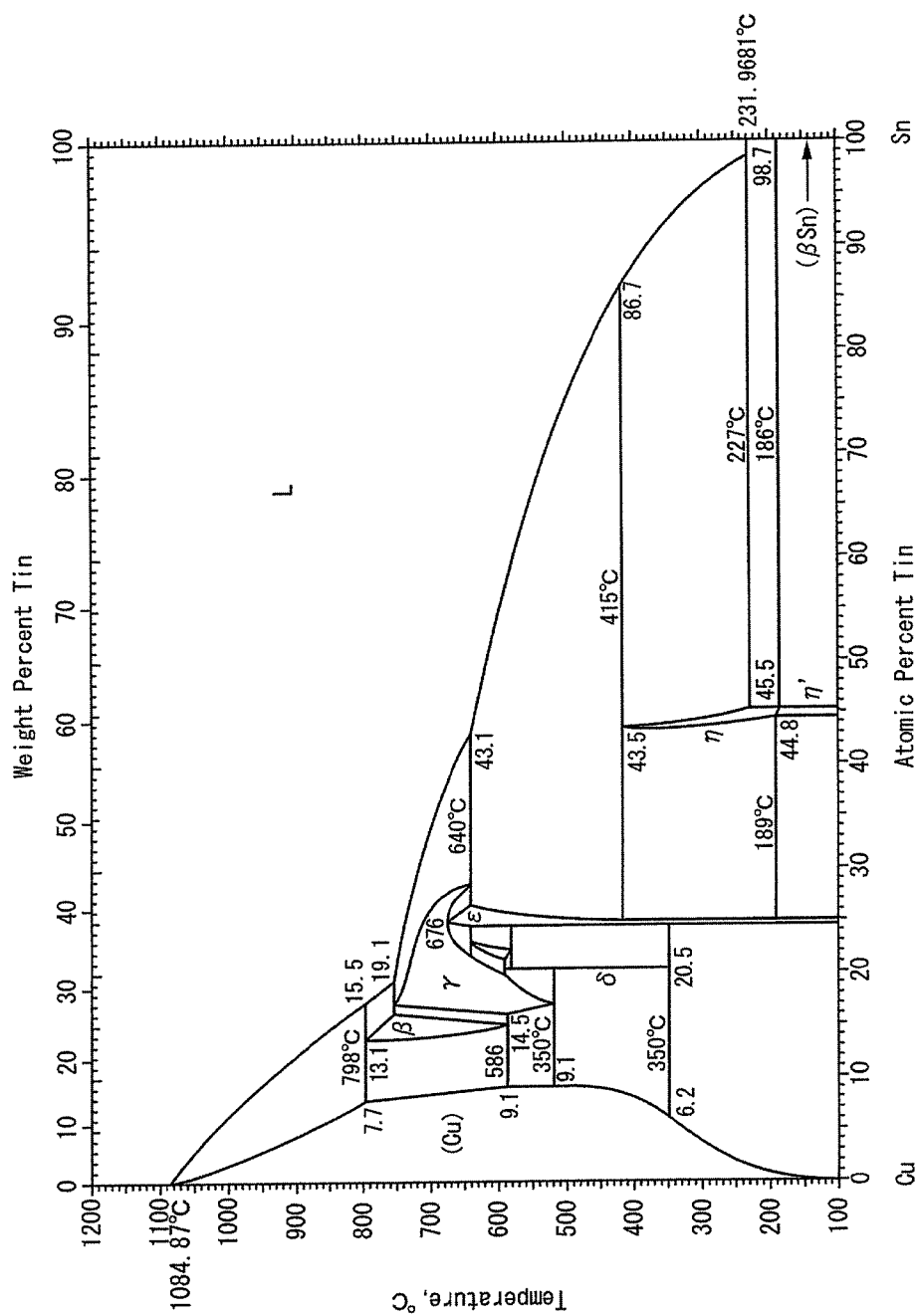
FIG. 4 is a state diagram of Cu—Sn binary alloy.

FIG. 4 is a state diagram of Cu—Sn binary alloy. The melting point of copper is 1084.87° C. that is slightly lower than 1100° C., and the melting point of tin is 231.9681° C.

As described above, the temperature of the takeoff part TO in the case of manufacturing soda-lime glass is about 580° C. Therefore, from FIG. 4, it should not be considered to utilize a tin alloy bath in which copper is added to tin.

That is, as is apparent from the state diagram of FIG. 4, in the case where the tin alloy bath is constituted by increasing the amount of copper added to 10%, 20% and the like, when a tin alloy bath having such a composition region is cooled to about 580° C., ε-phase as an intermetallic compound precipitates. When ε-phase as an intermetallic compound precipitates, the tin alloy bath is not established as the molten metal bath 3. That is, the glass ribbon 5 lifted from the molten metal bath 3 is not sufficiently hard and is still in a deformable state in the takeoff part TO. Therefore, in the case where a hard foreign matter is generated in the takeoff part TO, the glass ribbon 5 deforms, and it is impossible to manufacture a flat sheet. For this reason, in the molten metal bath 3 at the takeoff part TO, it is necessary to avoid the generation of an intermetallic compound (ε-phase or the like) which is a solid. Therefore, in the case of manufacturing soda-lime glass, it cannot suppose that copper is added to tin to form an alloy bath.

On the other hand, in the case of manufacturing alkali-free glass, the temperature of the takeoff part TO is 700° C. or higher and ε-phase does not precipitate, as described above. Therefore, it is understood that a tin alloy bath in which copper is added to tin can be used.

Examples of the alkali-free glass include alkali-free glass containing, in terms of mass % on the basis of oxides, $SiO_2$: 50 to 73%, $Al_2O_3$: 10.5 to 24%, $B_2O_3$: 0 to 12%, MgO: 0 to 8%, CaO: 0 to 14.5%, SrO: 0 to 24%, BaO: 0 to 13.5%, provided that MgO+CaO+SrO+BaO: 8 to 29.5%, and $ZrO_2$: 0 to 5%.

In this case, in the case where a strain point is high and meltability is considered, alkali-free glass containing, in terms of mass % on the basis of oxides, $SiO_2$: 58 to 66%, $Al_2O_3$: 15 to 22%, $B_2O_3$: 5 to 12%, MgO: 0 to 8%, CaO: 0 to 9%, SrO: 3 to 12.5%, and BaO: 0 to 2%, provided that MgO+CaO+SrO+BaO: 9 to 18%, is preferred.

In the case of considering high strain point, alkali-free glass containing, in terms of mass % on the basis of oxides, $SiO_2$: 54 to 73%, $Al_2O_3$: 10.5 to 22.5%, $B_2O_3$: 0 to 5.5%, MgO: 0 to 8%, CaO: 0 to 9%, SrO: 0 to 16%, and BaO: 0 to 2.5%, provided that MgO+CaO+SrO+BaO: 8 to 26%, is preferred.

In the case where the molten glass G which is to be alkali-free glass contains sulfur (S), there is a possibility that tin sulfide is generated when forming into the glass ribbon 5 on the liquid surface of the tin alloy bath. Tin sulfide has high vapor pressure. Therefore, there is a concern that defects (top speck) due to coagulation and falling of tin vapor are further liable to be generated.

For this reason, it is preferred that the molten glass G does not substantially contain sulfur (S) from the standpoint of further suppression of the generation of top speck.

Specifically, the proportion of $SO_3$ in the molten glass G is preferably 5 mass % or less, more preferably 1 mass % or less, and still more preferably 0.1 mass % or less.

The float glass manufactured by the present embodiment (float glass of the present embodiment) is obtained by forming the molten glass G into the glass ribbon 5 on the liquid surface of the molten metal bath 3 which is the above-described tin alloy bath. Therefore, differing from the case of manufacturing a float glass using a tin bath of 100% tin, copper (copper atom) is contained in a region on the surface side of the float glass (bottom surface), which has been in contact with the molten metal bath 3.

For this reason, the bottom surface of the float glass of the present embodiment can exhibit some effects originated from copper, for example, the following first to third effects.

Figure 5:
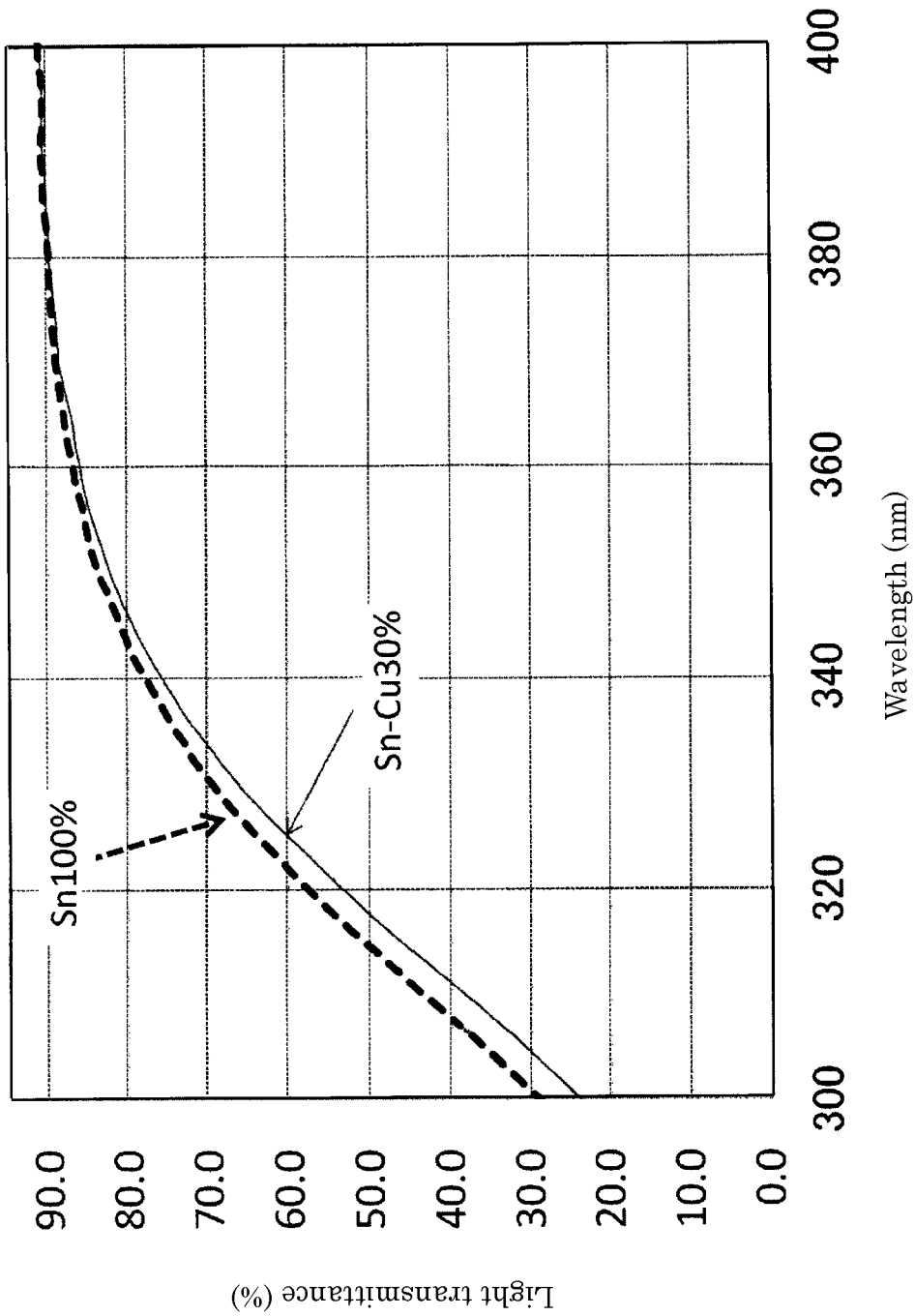
FIG. 5 is a graph relating to ultraviolet transmittance of a float glass.

The first effect is an effect of cutting UV light. FIG. 5 is a graph relating to ultraviolet transmittance of a float glass. The vertical axis indicates light transmittance (unit: %) and the horizontal axis indicates a wavelength (unit: nm). As shown in the graph of FIG. 5, in the float glass manufactured using a tin alloy bath containing 30 mass % of copper, light transmittance at a wavelength of 350 nm or less is decreased as compared with the float glass manufactured using a tin bath of 100% tin. Therefore, for example, blue light emitted from a liquid crystal screen can be further cut.

Figure 6:
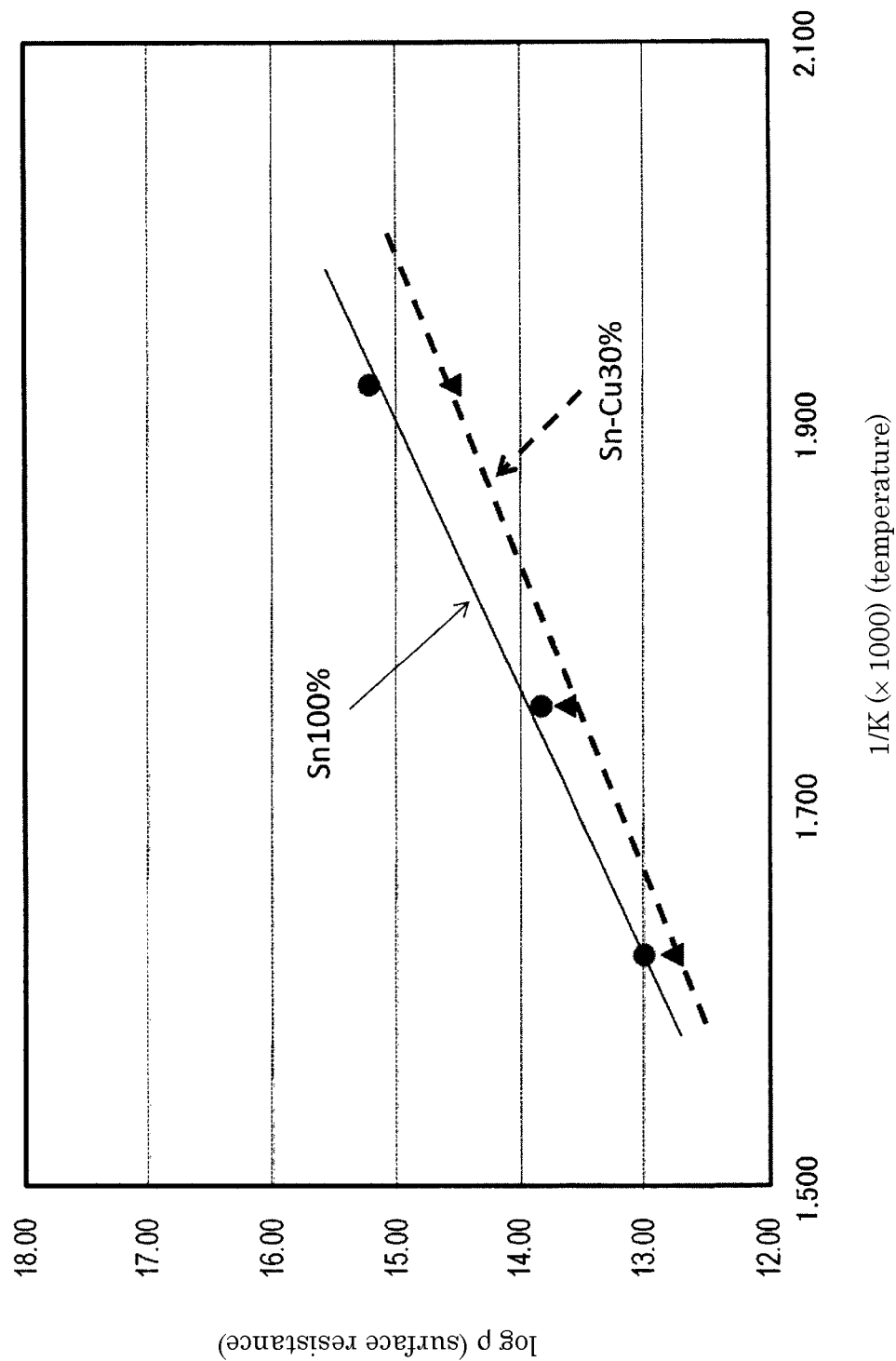
FIG. 6 is a graph relating to surface resistance of a float glass.

The second effect is an effect of decreasing surface resistance. FIG. 6 is a graph relating to surface resistance of a float glass. The vertical axis indicates a logarithmic value (log ρ) of a surface resistance value ρ (unit: Ω/square), and the horizontal axis indicates an inverse of a measurement temperature by an absolute temperature. As shown in the graph of FIG. 6, in the float glass manufactured using a tin alloy bath containing 30 mass % of copper, the surface resistance is decreased as compared with a float glass manufactured using a tin bath of 100% tin.

The third effect is an antibacterial effect. The antibacterial effect is demonstrated in "Examples" described hereinafter.

In the float glass of the present embodiment, copper is taken into a surface (bottom surface) which is in contact with the molten metal bath from the stage of forming the molten glass G into the glass ribbon 5.

For this reason, in the float glass of the present embodiment, the existence region of copper (copper atom) from the outermost surface is deeper as compared with, for example, the case of introducing copper into the surface of the float glass manufactured using a tin bath of 100% tin, in a post-treatment. Therefore, the above-mentioned performances originated from copper are difficult to be decreased as compared with the case of imparting the same performances by other method such as surface treatment, even though the surface of the float glass is rubbed or polished for any purpose.

Furthermore, in the case of comparing in the same depth from the outermost surface, the concentration of copper (copper atom) in the float glass of the present embodiment is larger than that in a glass in which copper is introduced by a post-treatment.

Specifically, on the surface side of the float glass (bottom surface), which has been in contact with the molten metal bath 3, the concentration of copper at a depth of 30 μm is preferably 5 mass ppm or more, more preferably 10 mass ppm or more, and still more preferably 15 mass ppm or more. The upper limit thereof is not particularly limited. However, when the concentration of copper is too high, there is a case that coloration is appeared in a glass. From the standpoint of the suppression of the coloration, the concentration is preferably 50 mass ppm or less, and more preferably 30 mass ppm or less.

Similarly, on the surface side of the float glass (bottom surface), which has been in contact with the molten metal bath 3, the concentration of copper at a depth of 70 μm is preferably 5 mass ppm or more, and more preferably 10 mass ppm or more. The upper limit thereof is not particularly limited. However, from the same reason as above, the concentration is preferably 50 mass ppm or less, and more preferably 30 mass ppm or less.

Furthermore, the concentration of copper at a depth of 100 μm is preferably 1 mass ppm or more, and more preferably 10 mass ppm or more. The upper limit thereof is not particularly limited. However, from the same reason as above, the concentration is preferably 50 mass ppm or less, and more preferably 30 mass ppm or less.

There is a case that a glass originally contains a slight amount of copper as a slight amount of impurity derived from a raw material. For this reason, in the float glass of the present embodiment, a slight amount of copper may be detected even on a surface side which has not been in contact with the molten metal bath 3 as a tin alloy bath having copper added thereto. However, the concentration of copper in such a case is naturally low value as compared with the surface side which has been in contact with the molten metal bath 3. Specifically, on the surface side which has not been in contact with the molten metal bath 3, the concentration of copper on the outermost surface is, for example, 1 mass ppm or less, preferably 0.8 mass ppm or less, and more preferably 0.5 mass ppm or less.

On the surface side (bottom surface) which has been in contact with the molten metal bath 3, the ratio (outermost surface/depth 30 μm) between the concentration (unit: mass ppm) of copper on the outermost surface and the concentration (unit: mass ppm) of copper at a depth of 30 μm is preferably from 1.0 to 2.0, more preferably from 1.0 to 1.7, and still more preferably from 1.0 to 1.2.

Similarly, on the surface side (bottom surface) which has been in contact with the molten metal bath 3, the ratio (outermost surface/depth 70 μm) between the concentration of copper on the outermost surface and the concentration of copper at a depth of 70 μm is preferably from 1.0 to 2.0, and more preferably from 1.0 to 1.7.

Furthermore, the ratio (outermost surface/depth 100 μm) between the concentration of copper on the outermost surface and the concentration of copper at a depth of 100 μm is preferably from 1.0 to 2.0, and more preferably from 1.0 to 1.8.

In addition, in the float glass of the present embodiment, on the surface side (bottom surface) which has been in contact with the molten metal bath 3, when a thickness of the float glass is defined as T, it is preferred that copper is present at a depth of T/7.

In the present embodiment, the concentration of copper (Cu) in the float glass is measured by secondary ion mass spectrometry (SIMS) as described in "Examples" described hereinafter.

The thickness of the float glass of the present embodiment is preferably 1.5 mm or less, and more preferably 1.2 mm or less. The lower limit of the thickness is not particularly limited, but is preferably 0.1 mm or more, and more preferably 0.3 mm or more. The thickness is adjusted by the top rolls 31 as described above. The glass having a thickness of 1.5 mm or less is used in, for example, high quality glass for electronics or the like in many cases.

EXAMPLES

Examples according to the present invention are described below, and the present invention is further described.

Assuming that the manufacturing apparatus 1 of FIG. 1 is used and a glass ribbon is formed by filling a float bath with a tin alloy bath, the change in thermogravimetry was measured in the case where 100 mg of a sample was maintained at 1200° C. for a predetermined period of time using TG (Thermal Gravimetory) in reducing atmosphere of hydrogen gas: 1% and nitrogen gas: 99%. More specifically, a sample was heated to 1200° C. over 130 minutes, and the retention was started. The volatilization volume from the point of time at which the retention was started was measured. The measurement results are shown in FIG. 7.

Figure 7:
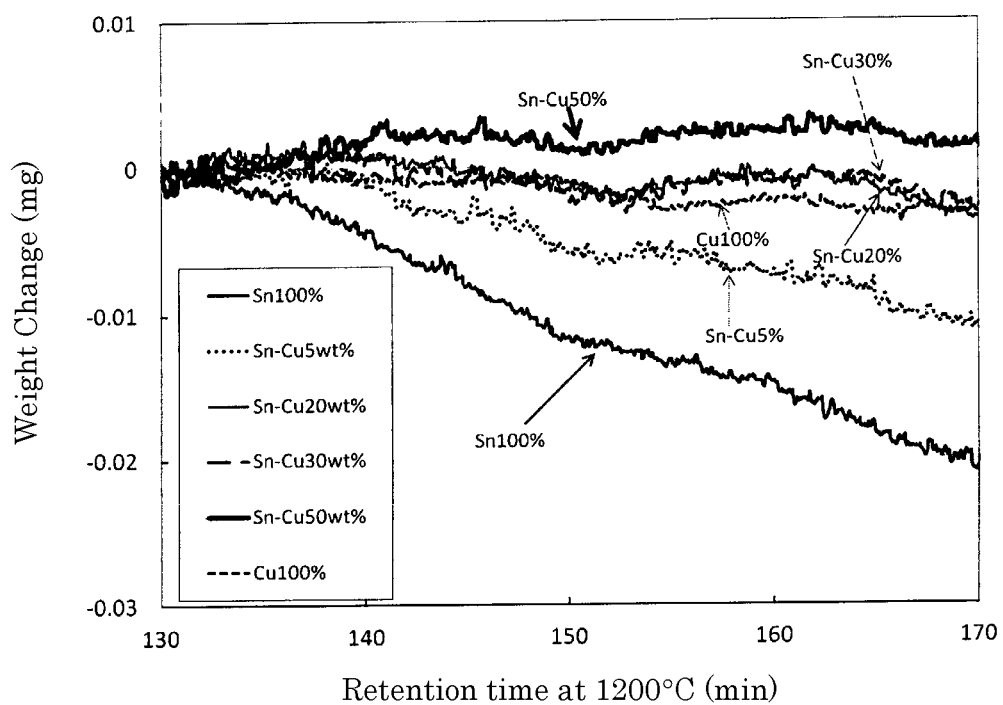
FIG. 7 is a graph showing the correlation between a retention time and weight change in the case of an Sn—Cu alloy bath.
Figure 8:
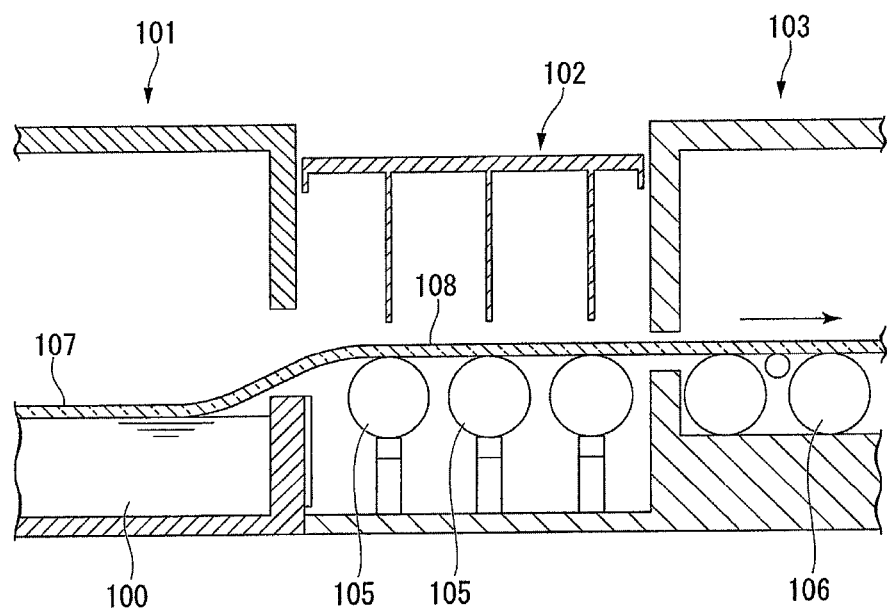
FIG. 8 is a structure view showing an example of the conventional apparatus for manufacturing a float glass.
Figure 9:
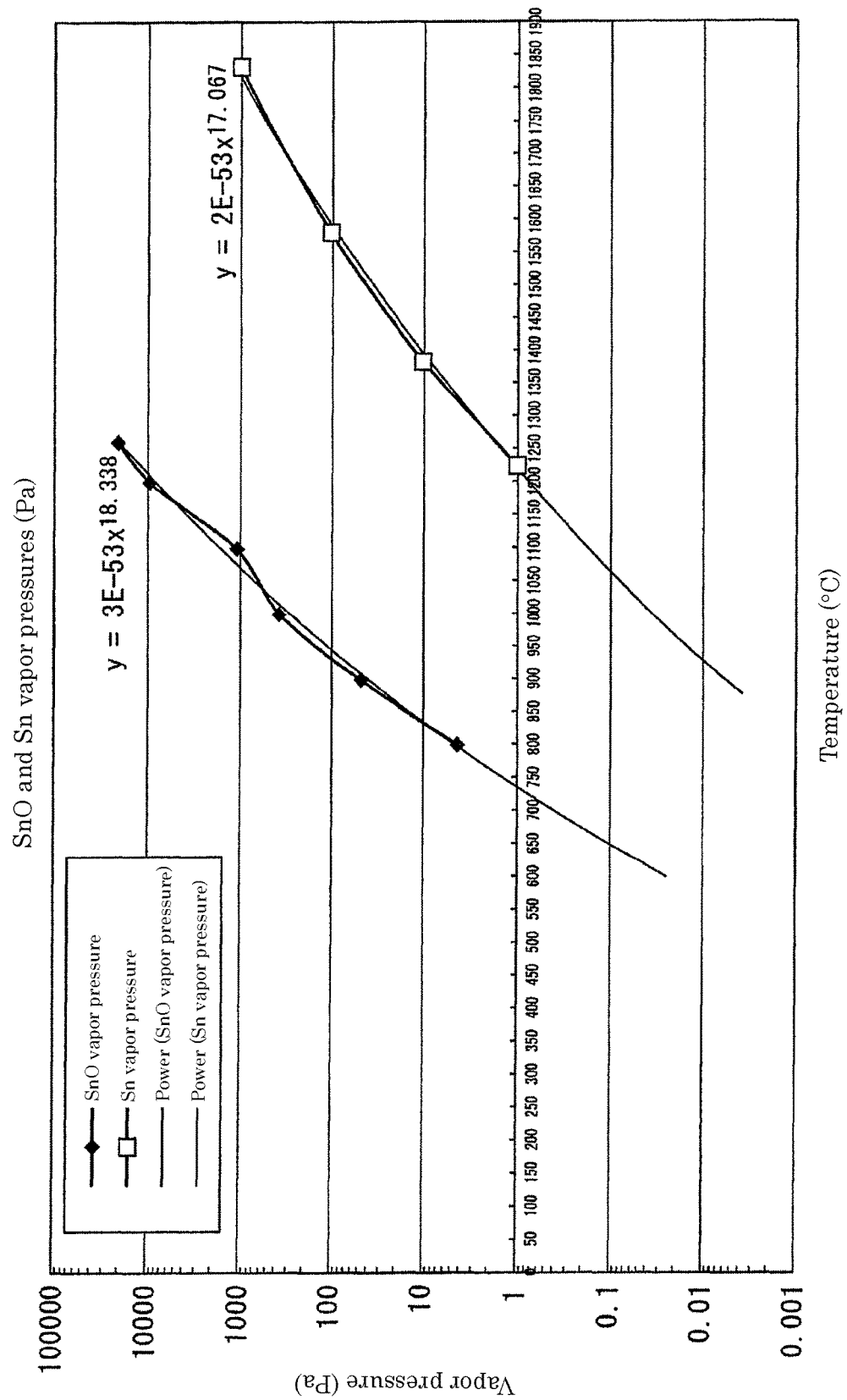
FIG. 9 is a graph showing the relationship between vapor pressures of Sn and SnO and temperatures thereof.

FIG. 7 is a graph showing a correlation between a retention time and weight change in the case of an Sn—Cu alloy bath. Regarding the specific measurement results of the volatilization volume, "copper concentration (unit: mass %) (shown as "wt %" in FIG. 7): the volatilization volume (unit: mg) per unit time (1 minute)" was Cu 0%: 0.004 mg, Cu 0.5%: 0.004 mg, Cu 1%: 0.0032 mg, Cu 5%: 0.00024 mg, Cu 10%: 0.00018 mg, Cu 20%: 0.00006 mg, Cu 30%: 0 mg, Cu 50%: 0 mg and Cu 60%: 0 mg.

As shown in the graph of FIG. 7, when a tin alloy bath having 5 mass % of copper added thereto was used, the volatilization volume was decreased as compared with a tin bath of 100% tin. Furthermore, when a tin alloy bath having 30 mass % of copper added thereto was used, the volatilization volume was greatly decreased as compared with a tin bath of 100% tin.

It was understood from the results shown in FIG. 7 that in reducing atmosphere, the volatilization volume of an alloy bath of Sn—Cu alloy (30 mass %) could be substantially zero as compared with a tin bath of Sn 100%.

It was understood from the test results that the vapor volatilization volume could be minimum by using Sn—Cu alloy containing Cu in an amount of about 30 mass % or more. It was understood that the volatilization volume was greatly decreased as compared with the case of Sn 100%, and additionally was peculiar volatilization volume smaller than the case of Cu 100%.

As a result, it can be assumed that when the above-described tin alloy bath is used as the molten metal bath 3 of the float bath 2 in the manufacturing apparatus 1 shown in FIG. 1, high quality float glass free of defects such as top speck due to coagulation and falling of tin vapor can be manufactured.

Example 1

Using the manufacturing apparatus 1 of FIG. 1, the glass ribbon 5 was formed from the molten glass G, followed by annealing and cutting, thereby a float glass (alkali-free glass) having a thickness of 700 μm was manufactured. In this case, a tin alloy bath containing 30 mass % of copper was used as the molten metal bath 3 of the float bath 2 for forming into the glass ribbon 5.

The composition of the molten glass G was, in terms of mass % on the basis of oxides, $SiO_2$: 59.70%, $Al_2O_3$: 16.90%, $B_2O_3$: 7.90%, MgO: 3.27%, CaO: 4.00%, SrO: 7.69%, and BaO: 0.10%, provided that MgO+CaO+SrO+BaO: 15.06%, and $SO_3$ was not substantially contained therein.

In Example 1, the temperature in the takeoff part TO was set to about 750° C. in the stage of manufacturing the float glass as alkali-free glass. In this case, when an intermetallic compound (ε phase) is formed in a tin alloy bath at the takeoff part TO, a liquid surface does not become smooth, and a line due to deformation is generated on the surface of the glass ribbon 5 passed. However, a line due to deformation was not observed in Example 1. Namely, an intermetallic compound (ε phase) was not formed in the tin alloy bath at the takeoff part TO.

Comparative Example 1

A float glass having a thickness of 700 μm was manufactured in the same manner as in Example 1, except for using a tin bath of 100% tin as the molten metal bath 3.

<Number of Top Speck>

Regarding the float glasses of Example 1 and Comparative Example 1, the number of defects (top speck) on the surface opposite to the molten metal bath 3 side was observed by a visual observation method using high-luminance light source on a predetermined area (10 $m^2$). The observation results are shown in Table 1 below.

TABLE 1

|  | Number of top speck |
| --- | --- |
| Example 1 | 1 defect/$m^2$ or less |
| Comparative Example 1 | 10 defects/$m^2$ |

It was understood from the results shown in Table 1 above that the number of top speck in Example 1 was 1 defect/$m^2$ or less that does not become practical problem, and high quality float glass was obtained.

On the other hand, it was understood that the number of top speck in Comparative Example 1 was 10 defects/$m^2$ and there is a problem on quality of a float glass.

<Concentration of Copper>

For the float glasses of Example 1 and Comparative Example 1, the concentration of copper (Cu) was measured by secondary ion mass spectrometry (SIMS), respectively. The measurement results are shown in Table 2 below.

Specifically, polishing was gradually conducted in a depth direction from the surface (bottom surface) which had been in contact with the molten metal bath 3, and when the polishing reached a predetermined depth (10 μm, 30 μm, 50 μm, 70 μm and 100 μm), the concentration of copper at each depth was measured using secondary ion mass spectrometer (adept 1010, manufactured by ULVAC). In this case, in order to eliminate contamination on the surface, the concentration at a depth of 0.4 μm from the bottom surface was used as the concentration of the outermost surface.

The concentration measured by SIMS is represented by the unit [atoms/$cm^3$]. Therefore, an average atom number per unit volume of a glass (calculated from molar concentration of each component) was obtained, the concentration was divided by the average atom number, followed by conversion. Thus, the mass concentration (mass ppm) was obtained.

TABLE 2

| | Bath contact side | | | | | | | Bath non-contact side |
|---|---|---|---|---|---|---|---|---|
| | Concentration of copper [mass ppm] | | | | | | Concentration ratio of | Concentration of copper |
| | Outermost surface | Depth 10 μm | Depth 30 μm | Depth 50 μm | Depth 70 μm | Depth 100 μm | copper (outermost surface/depth 30 μm) | [mass ppm] Outermost surface |
| Example 1 | 19 | 19 | 19 | 19 | 15 | 11 | 1.0 | 0.3 |
| Comparative Example 1 | 0.3 | 0.3 | 0.3 | 0.3 | 0.3 | 0.3 | 1.0 | 0.3 |

As shown in Table 2 above, in the float glass of Comparative Example 1 using the tin bath of 100% tin, the concentration of copper was 0.3 mass ppm on the outermost surface and at each depth.

On the other hand, in the float glass of Example 1 using the tin alloy bath containing 30 mass % of copper, as shown in Table 2 above, the concentration of copper was 19 mass ppm on the outermost surface of the bottom surface, 19 mass ppm at a depth of 10 μm, 19 mass ppm at a depth of 30 μm, 19 mass ppm at a depth of 50 μm, 15 mass ppm at a depth of 70 μm and 11 mass ppm at a depth of 100 μm (the glass originally contained copper as a trace impurity derived from raw materials in an amount of about 0.3 mass ppm).

It was understood that considerably deep copper permeation layer was obtained by the present treatment, as compared with the case that the copper permeation layer obtained by the ordinary surface treatment is 1 μm or less.

In the float glass of Example 1, the concentration of copper at a depth of 100 μm was 11 mass ppm. Therefore, when a thickness is defined as T, it is apparent that copper is present at a depth of T/7 (700/7), that is, a depth of 100 μm.

<Evaluation of Antibacterial Property>

For the float glasses of Example 1 and Comparative Example 1, the antibacterial property on the outermost surface of the bottom surface was evaluated based on JIS Z2801: 2010 (Antibacterial products-Test for antibacterial activity and efficacy), respectively. Specifically, according to the judgment criteria of antibacterial effect described in the JIS, an antibacterial activity value to a colon *bacillus* was obtained. The content of JIS Z2801: 2010 is incorporated herein by reference.

Furthermore, for the float glass of Example 1, polishing was conducted in a depth direction from the bottom surface, and an antibacterial activity value on the surface at a depth of 50 μm was similarly obtained.

When the antibacterial activity value is 2.0 or more, it is evaluated as having excellent antibacterial property. The results are shown in Table 3 below.

TABLE 3

| | | Antibacterial activity value |
|---|---|---|
| Example 1 | Outermost surface (bath contact side) | 2.52 |
| | Depth 50 μm | 2.45 |
| Comparative Example 1 | Outermost surface (bath contact side) | 0.07 |

As is apparent from the results shown in Table 3 above, it was understood that the float glass of Example 1 using the tin alloy bath containing 30 mass % of copper showed excellent antibacterial property on its bottom surface, as compared with the float glass of Comparative Example 1 using the tin bath of 100% tin.

Furthermore, it was understood that the float glass of Example 1 showed excellent antibacterial property in the same degree as the outermost surface even on the surface polished to a certain extent of the bottom surface.

INDUSTRIAL APPLICABILITY

The technique of the present invention can be widely applied to the general manufacturing technique of a glass by a float process.

DESCRIPTION OF REFERENCE NUMERALS AND SIGNS

G: Molten glass
TO: Takeoff part
1: Manufacturing apparatus of float glass
2: Float bath
2A: Molten metal bathtub
2B: Upper structure
2a: Inlet
3: Molten metal bath
5: Glass ribbon
6: Dross box part
6A: Lower casing
6B: Upper casing
6a: Side wall
6b: Side wall
6c: Bottom wall
7: Lift-out roll
9: Lehr roll
10: Annealing furnace
11: Supply passage
12: Lip
13: Tweel
15: Front lintel
16: Ceiling wall
17: Rear end wall
18: Exit
21: Seal block
22: Pedestal
23: Supply pipe
24: Ceiling wall
25: Drape
31: Top roll
32: Tip
33: Rotary member
34: Protrusion
35: Central axis
100: Molten metal bath
101: Float bath
102: Dross box

103: Annealing furnace
105: Lift-out roll
106: Lehr roll
107: Molten glass
108: Glass ribbon

The invention claimed is:

1. A method for manufacturing a float glass, comprising: supplying molten glass to a liquid surface of a molten metal bath placed in a float bath, thereby forming into a glass ribbon; lifting the glass ribbon from the liquid surface of the molten metal bath, followed by annealing and cutting to obtain a float glass, wherein
　　the float glass is alkali-free glass,
　　the molten metal bath is a tin alloy bath for a float bath, which comprises 1 mass % or more and 40 mass % or less of copper with the remainder being unavoidable impurities and tin,
　　a proportion of $SO_3$ in the molten glass is 0.1 mass % or less, and
　　a temperature of a region at which the glass ribbon is lifted from the liquid surface of the molten metal bath in the float bath is 700° C. or higher.

2. The method for manufacturing a float glass according to claim 1, wherein an $Al_2O_3$ content in the alkali-free glass is from 10.5 to 24 mass %.

3. The method for manufacturing a float glass according to claim 1, wherein the molten metal bath contains 30 to 40 mass % of copper.

* * * * *